United States Patent [19]

Bruce

[11] Patent Number: 5,010,771

[45] Date of Patent: Apr. 30, 1991

[54] FAST RESPONSE, HIGH SENSITIVITY MANOMETRIC WIND SENSOR

[75] Inventor: Charles W. Bruce, Las Cruces, N. Mex.

[73] Assignee: The United States of America as represented by the Secretary of the Army, Washington, D.C.

[21] Appl. No.: 504,525

[22] Filed: Apr. 4, 1990

[51] Int. Cl.[5] .......................... G01F 1/20; G01F 1/46; G01C 21/00; G01L 11/00
[52] U.S. Cl. ................................ 73/861.18; 73/182; 73/861.04; 73/702; 73/861.67; 73/861.65
[58] Field of Search ...................... 73/861.18, 702, 182, 73/861.65, 183, 861.67, 861.04, 717, 24.05

[56] References Cited

U.S. PATENT DOCUMENTS 4,489,592 12/1984 Pacanowski et al. ................ 73/24.5
4,506,553 3/1985 Bruce et al. ...................... 73/861.65

Primary Examiner—Joseph A. Orsino
Assistant Examiner—Franklin V. Nguyen
Attorney, Agent, or Firm—Saul Elbaum; Paul S. Clohan; Walter R. Baylor

[57] ABSTRACT

A gas flow alternator cyclically connects a microphone to a dynamic flow pressure and then a reference static flow pressure. The microphone converts the pressures to a resultant alternating differential signal providing a first input to a phase-locked amplifier. A second amplifier input is derived from an optical pickup mounted within the housing. A readout connected in the circuit with the amplifier indicates the dynamic flow pressure.

8 Claims, 3 Drawing Sheets

FAST RESPONSE, HIGH SENSITIVITY MANOMETRIC WIND SENSOR

RIGHTS OF THE GOVERNMENT

The invention described herein may be manufactured, used and licensed by or for the United States Government for Governmental Purposes without payment to me of any royalty thereon.

BACKGROUND OF THE INVENTION

In a number of scientific applications, it is important to obtain accurate readings of very low and/or rapidly fluctuating air flow rates while retaining a large dynamic range. Unfortunately, conventional air flow sensors are neither sensitive to small flow rates nor do they have fast response time. Further, when used in meteorological applications, harsh environments exist which have hampered the disign of a satisfactory instrument.

One apparatus for overcoming the past deficiencies mentioned above is described in U.S. Pat. No. 4,506,553. In that apparatus, the difference between a dynamic wind pressure at an orifice facing into the wind and a reference pressure is measured. These dynamic and static pressures are then converted to acoustical waves to be detected by a microphone which, with acoustical and electronic processing techniques, provides a very sensitive output. The conversion is implemented by mechanically alternating between two ports respectively connected to the dynamic pressure orifice and the reference pressure orifice. The resulting signal is an acoustical wave. The signal is then passed into a microphone and then processed electronically for a readout indication. The entire acoustical system is designed to obtain the requisite high sensitivity and time response. Sensitivity may be increased by using phase-sensitive amplification of the electrical signal from the microphone. The previously mentioned mechanical switching between two ports is accomplished by utilizing a rotor with passages formed therethrough. A standard photo-optic rotor pickup detects the rotational rate and phase of the rotor which corresponds to the rotational rate and phase of electrical signals due to the acoustical signals picked up by the microphone. Utilizing the photo-detector output as a second input to the phase sensitive amplifier, amplification of only the AC component of the signal, which has a fixed phase relationship to that of the rotor, is processed. A readout is connected to the output of the amplifier for indication of flow rates with significant sensitivity and fast response time.

Thus in the prior art, the alternator was in some form of rotor through which the pressure was transmitted to the microphone system and this alternator carried a significant volume of air. This type of system caused a vacuum pumping action to take place and this led to small but unwanted acoustical signals. The drives for the alternator also caused bearing noise and shake which would be picked up by the microphone even when it was isolated. Additionally, when the response bandwidth was increased to obtain fast response (as in turbulence measurements), any of these incoherent noises decreased the sensitivity of the instrument.

OBJECTS AND SUMMARY OF THE INVENTION

It is therefore a primary object of the present invention to provide a significant increase in the sensitivity of devices which measure manometric wind/air measurements.

A further object of the present invention is to increase the sensitivity and signal bandwidth due to reduction of the noise floor.

A still further object of the present invention is to provide a simpler mechanical design and thus lower cost of manufacture and to provide more reliable operation of manometric wind/air measurement devices.

The present invention will find great acceptance in the field of turbulence sensing or mechanical turbulence sensing and can provide wind component sensing over a very wide dynamic range and in extreme weather conditions. Sensing of very small flow rates (system leaks and the like) and mapping of updraft for hot plume characterization is now possible with the present invention. Sensing of gas flow (and spatial mapping) where flow interruption must be minimized and sensing of flow where spatial variations are large (and the probe must be small) will be improved. The mapping of turbulent flow around objects for reduction of the drag coefficient will now be possible to an increased degree. It will also be possible to provide control of other devices to match or form fixed relationships with wind or air flow speeds, e.g., isokinetic sampling devices.

The present invention provides a key change in the form of the alternator used in past devices. In the previous devices, the alternator was in some form of rotor through which the pressure was transmitted to a microphone system. In the present invention, the rotor is replaced by a blade of one form or another. This blade is an essentially two dimensional sheet with an aperture which alternatively connects the high and low pressure ports thus unlike prior art rotors the alternator does not carry a significant volume of air.

BRIEF DECRIPTION OF THE DRAWINGS

DETAILED DESCRIPTION OF THE PREFERRED EMBODIMENTS

Figure 1:
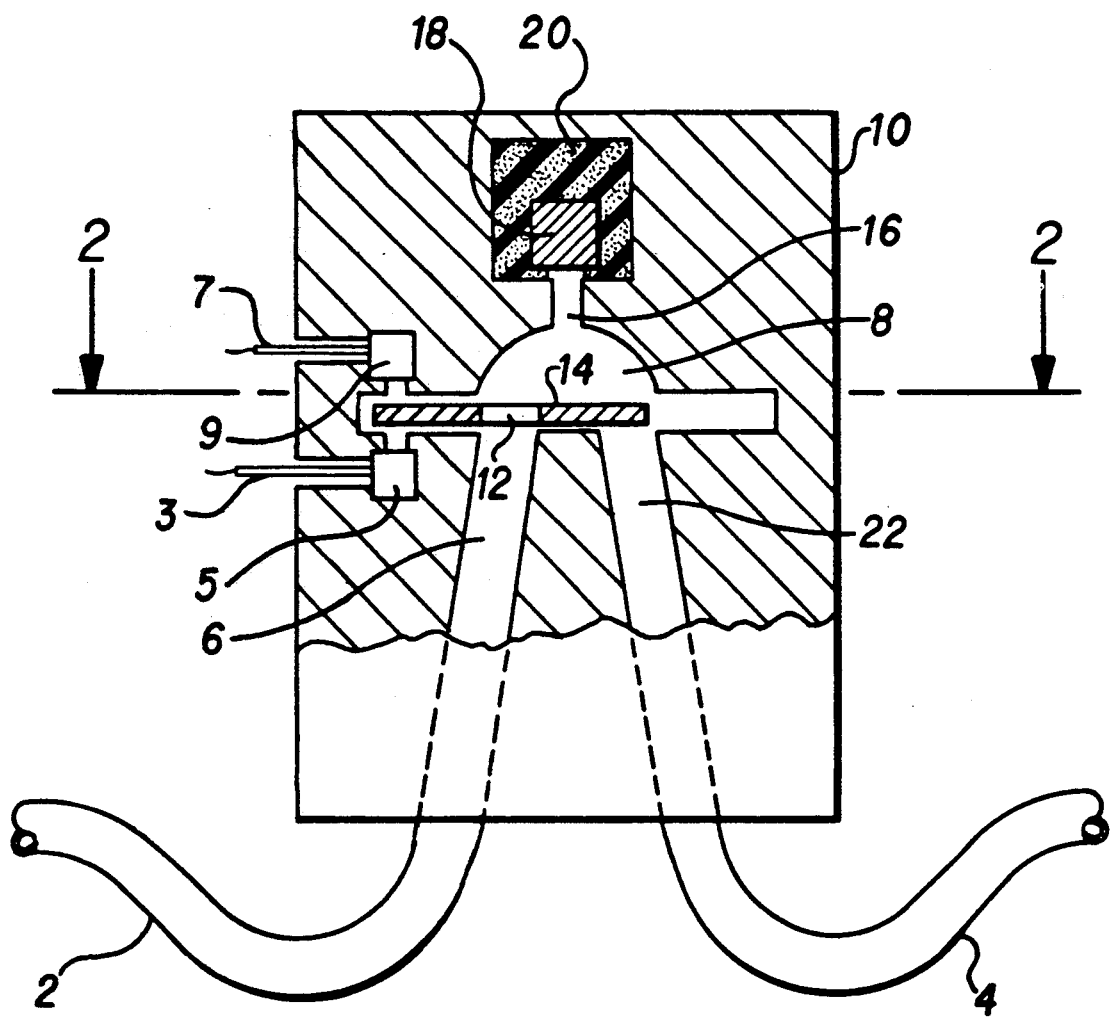
FIG. 1 is a cut-away view of the inventive sensor.

Referring to the figures and more particularly FIG. 1 thereof, the apparatus of the present invention is seen to include a sensor 10 to which is connected a dynamic air flow data tube 2 and a static air reference data tube 4. Tube 2 is directed toward an air stream so that sensor 10 can measure the dynamic pressure caused by its flow. The dynamic pressure is convertible to an airflow rate using a known mathematical relationship. In a typical atmospheric environment, airflow rates, or their fluctuations, may be quite small. A pitot tube (not shown) serves as the simplest form of inlet while the opposite tube end is an outlet for directing the flow into passageway 6 formed in the sensor housing. The passageway 6 communicates with plenum 8 via hole 12 in alternator 14. An orifice 16 is formed at the upmost portion of plenum 8 for passage to microphone 18 which is suspended in place by foam 20.

Figure 2:
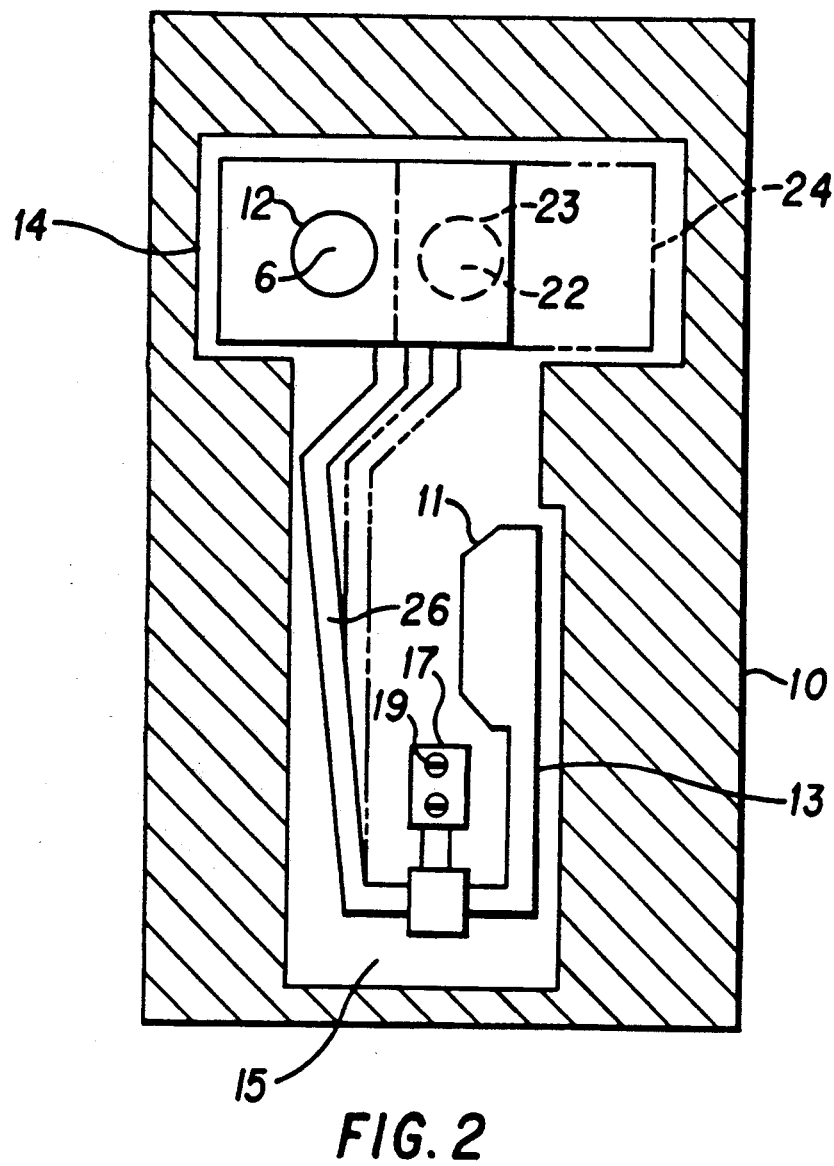
FIG. 2 is a cross sectional view taken along a plane passing through section line 2—2 of FIG. 1 with the sensor alternator in position for measuring dynamic wind pressure.

FIG. 2 illustrates the position of alternator 14 when it allows passage of the dynamic air flow data through passageway 6 into plenum 8 via hole 12. As will be observed, passageway 6 now communicates with orifice 16 through plenum 8. A second tube 4 containing the static air reference data is likewise allowed to communicate with orifice 16 through plenum 8 when hole 12 lines up with passageway 22 when alternator 14 is in the rightmost position as indicated by numeral 24. The position of passageway 22 is indicated by dashed circle 23 in FIG. 2.

The movement of alternator 14 back and forth allowing alternate communication of passageway 6 and passageway 22 with orifice 16 is effected by tuning fork 15. Tuning fork 15 has a long arm 26 connected to alternator 14 and a short arm 13 which has a counterbalancing weight 11 which compensates for the weight of alternator 14 and allows tuning fork 15 to vibrate at the proper frequency. Tuning fork 15 is mounted to sensor 10 via plate 17 and screws 19, and is driven electrically. Thus the alternate back and forth movement of alternator 14 driven by tuning fork 15 allows first the dynamic air flow data to reach microphone 18 followed by the static air reference data. Thus, microphone 18 has sensed a net acoustical wave derived in first part from the air flow condition creating a dynamic pressure in tube 2, and in second part from the static air pressure in tube 4. In other words, microphone 18 alternatively receives dynamic air flow data from tube 2 and static air reference data through tube 4, once per cycle of alternator 14. Although the tuning fork does contribute some coherent signal from the reciprocating alternator, the incoherent noise is very much lower than for previous units.

Figure 4:
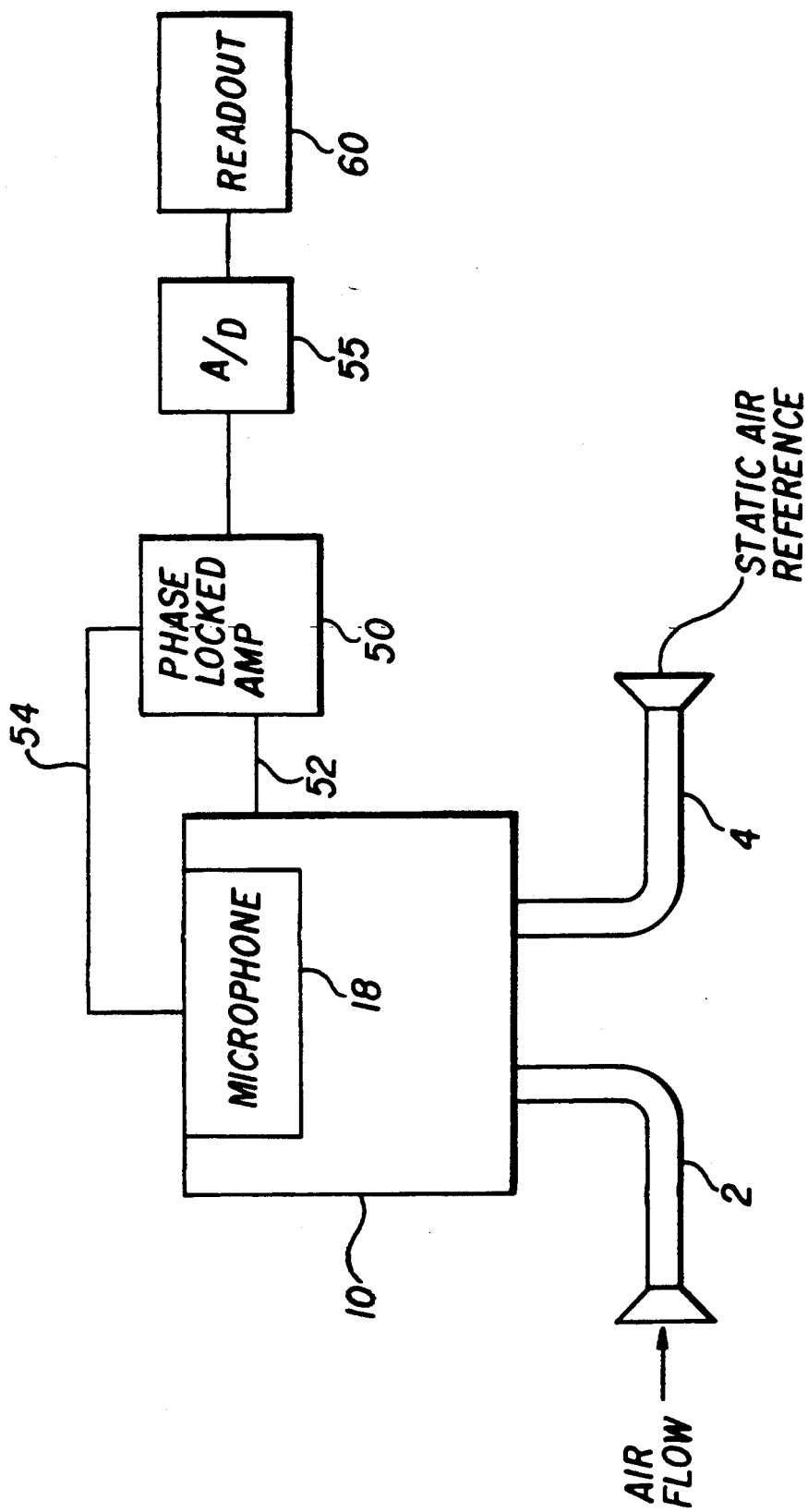
FIG. 4 is a schematic diagram of the present invention.

Processing of the data can be done in two manners. If high sensitivity is required, the processing method illustrated in FIG. 4 may be used. In this method, a conventional phase-locked amplifier 50 is connected to microphone 18 through connection 54. In order to provide alternator phase information to this amplifier, a conventional photo-optic pickup is mounted within housing 10. Specifically, an LED 5 and its associated wiring 3 is positioned in optical alignment with a detector 9 and its associated wiring 7 which may be a silicon detector, as shown in detail in FIG. 1. The detector 9 will detect light from the LED 5 once during each full cycle of the alternator 14. It is the electrical output from the detector 9 which forms the second input through connection 52 to the amplifier 50. The amplifier 50, of conventional design, amplifies only the AC component of the microphone 18 signal which has a fixed phase relationship to that of the alternator 14. This increases the signal-to-noise ratio of the electrical processing considerably. The output of the phase-locked amplifier 50 may be connected to a conventional analog-to-digital converter 55 which in turn drives a digital readout 60 indicating the measurement of dynamic airflow presented at tube 2. If less sensitivity is required, the microphone 18 may be used by connecting it directly to the A/D converter 55 or, in the event that an analog meter is to be used, directly to the analog meter.

Figure 3:
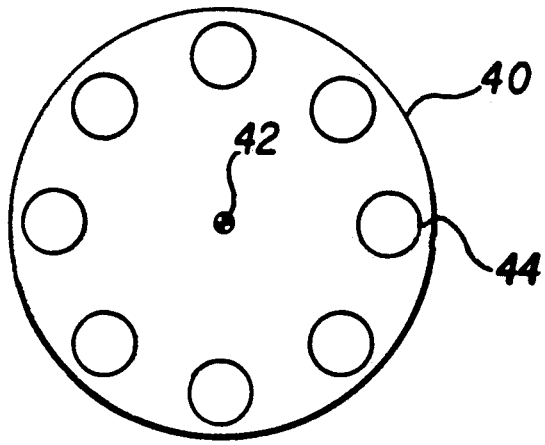
FIG. 3 is a top view of an alternate form of a sensor alternator.

An alternate form of alternator is shown in FIG. 3 and is designated by the numeral 40. This alternator, instead of moving in a back and forth motion, rotates about center point 42, which is connected to a motor in a similar fashion to that of the rotor in U.S. Pat. No. 4,506,663. Alternator 40 contains several holes 44 (in the example shown in FIG. 3 there are 8, but this is not the only number that will work satisfactorily). As alternator 40 rotates, holes 44 will alternately line up with passageways 6 and 22, and alternately block passageways 6 and 22, thus performing the same function as alternator 14 shown in FIGS. 1 and 2.

Accordingly, the above-described invention offers apparatus for high sensitivity and fast response manometric air flow/pressure sensing where air flow rates, including very low flow rates, of wind or turbulence are to be measured. For example, the present invention has been used to sense buoyancy above a large fire on a 50 foot sensing line. The sensed environment may therefore effectively be isolated from the sensor though high speed response will be affected if long lines are used. Meteorological sensors must also operate in rough environments. Here, a relatively short connection would isolate the sensor. Since this sensor does not require significant flow through the system, the alternator will not "see" precipitation, fog, aerosols, etc. since force or dynamic pressure is sensed, not a flow rate.

It is emphasized that although the invention is described in terms of air flow measurements, it is equally applicable for other gases.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A sensor for measuring gas flow comprising:
a housing having a first orifice for receiving dynamic gas flow therethrough, a second orifice spaced from the first orifice and communicating with a static gas, and a plenum spaced from the first and second orifice communicating with a microphone;
an oblong flat plate alternator means located inwardly of the housing and having an aperture located thereon for alternately completing a passage between the phenum and the first and second orifices thus subjecting the microphone to a resultant acoustic wave dependent upon the dynamic gas flow, said alternator means driven by a tuning fork.

2. The device of claim 1 further comprising means mounted in the housing and adjacent the alternator means for photo-optically detecting the alternation of the alternator.

3. The device of claim 2 further comprising a phase-locked amplifier having first and second inputs, said first input being connected to said microphone, and said second input being connected to the output of said photo-optically detecting means.

4. The device of claim 3 further comprising an indicating means connected in circuit with the output of the amplifier for displaying gas flow data.

5. A sensor for measuring gas flow comprising:
a housing having a first orifice for receiving dynamic gas flow therethrough, a second orifice spaced from the first orifice and communicating with a static gas, and a plenum spaced from the first and second orifice communicating with a microphone;
a circular flat plate alternator means located inwardly of the housing and having a plurality of apertures located thereon for alternately completing a passage between the plenum and the first and second orifices thus subjecting the microphone to a resultant acoustic wave dependent upon the dynamic gas flow.

6. The device of claim 5 further comprising means mounted in the housing and adjacent the alternator means for photo-optically detecting the alternation of the alternator.

7. The device of claim 5 further comprising a phase-locked amplifier having first and second inputs, said first input being connected to said microphone, and said second input being connected to the output of said photo-optically detecting means.

8. The device of claim 5 further comprising an indicating means connected in circuit with the output of the amplifier for display gas flow data.

* * * * *